United States Patent [19]

Delgrosso et al.

[11] 3,900,150

[45] Aug. 19, 1975

[54] DUPLEX COMPOSITE TAPE

[75] Inventors: Eugene J. Delgrosso, Wallingford; Carl E. Carlson, East Hartford, both of Conn.

[73] Assignee: United Aircraft Corporation, East Hartford, Conn.

[22] Filed: Aug. 22, 1974

[21] Appl. No.: 499,654

[52] U.S. Cl. ............ 228/185; 29/191.6; 29/195; 29/419; 228/190; 228/254; 228/122
[51] Int. Cl.² ........................................ B23K 28/02
[58] Field of Search ....... 29/419, 420, 471.1, 471.3, 29/472.3, 497.5, 498, 502, 504, 195, 191.4, 191.6

[56] References Cited
UNITED STATES PATENTS

| | | |
|---|---|---|
| 3,553,820 | 1/1971 | Sara .................................. 29/420 X |
| 3,571,901 | 3/1971 | Sara ..................................... 29/419 |
| 3,615,277 | 10/1971 | Kreider ................................. 29/195 |
| 3,795,042 | 3/1974 | Kreider et al. ...................... 29/472.3 |

*Primary Examiner*—Al Lawrence Smith
*Assistant Examiner*—K. J. Ramsey

[57] ABSTRACT

A fiber-reinforced metallic tape, and composites including a plurality of stacked and bonded tapes, characterized by inclusion of a layer which prevents contact of liquid metal with the reinforcing fibers during low pressure brazing.

10 Claims, 2 Drawing Figures

DUPLEX COMPOSITE TAPE

BACKGROUND OF THE INVENTION

1. Field of the Invention

The present invention relates to metal matrix composites and especially metal matrix tapes for low pressure bonding. More particularly, this invention is directed to the production of braze bondable metal matrix tapes and fiber-reinforced multilayer composites formed from a plurality of such tapes. Accordingly, the general objects of the present invention are to provide novel and improved methods of such character and the products resulting from the practice thereof.

2. Description of the Prior Art

It is well known that fiber reinforcement enhances the strength of numerous materials. This is particularly true in the case of lightweight metals such as aluminum. The concept of fiber strengthening is based on the fact that materials produced in fibrous form frequently exhibit a higher elastic modulus and, accordingly, higher stiffness and strength than the corresponding materials in bulk form. Thus, the development of structural high modulus composites has received considerable attention in recent years.

Substantial progress has been made in the development of high-strength, high-quality fibers comprised of, for example, materials such as boron and silicon carbide. Such fibers combine the high strength of fiber glass with a high modulus and permit the fabrication of fiber-reinforced structures having a superior balance of strength and stiffness.

In order to exploit the desirable properties of a fiber-reinforced composite, it is necessary to form the composite structure in such a manner that failure in several isolated fibers will not be transmitted to the surrounding fibers. A further fabrication requirement is to produce the composite in such a manner that loads applied thereto will be distributed with reasonable uniformity over the entire fiber bundle. One method of producing a composite having the requisite fiber distribution contemplates the encasing of multiple layers of uniformly distributed fibers in a matrix material which will deform plastically.

The state of the art with respect to the fabrication of fiber-reinforced composites is clearly represented by the disclosures of U.S. Pat. NO. 3,606,677 to K. Kreider and U.S. Pat. No. 3,615,277 to K. Kreider et al; both of said patents being assigned to the assignee of the present invention. U.S. Pat. Nos. 3,606,667 and 3,615,277 are incorporated into the disclosure of the instant application by reference.

To briefly summarize the state of the art, filaments having the desirable properties of high strength, high rigidity and high resistance to deterioration at elevated temperatures are arranged on a suitable base. The base will typically comprise a metal tape such as, for example, an aluminum fool. As disclosed in the above-referenced patents, the filaments and foil will be wound on a mandrel with the filaments arranged parallel to one another; the filaments typically being distributed in a ratio of 140 per lateral inch of foil. Thereafter, a metal matrix material is applied over the filaments in coalescent form by means of plasma arc spraying to produce a monolayer tape. As discussed in U.S. Pat. No. 3,615,277, the metal matrix material may comprise a brazing alloy whereby a plurality of the monolayer tapes may be stacked and thereafter joined together by low pressure braze bonding.

As noted above, the uniformly distributed fibers of a fiber-reinforced composite will preferably be encased in a matrix material which will deform plastically. As is also noted above, the benefits which may be realized by fiber reinforcement can be maximized by utilizing the fibers to enhance the physical characteristics of lightweight materials. Accordingly, a typical matrix material for a fiber-reinforced composite will be aluminum. A material particularly well suited for the production of high-strength, high-quality fibers is boron; boron fibers being commercially produced by the continuous vacuum deposition of boron on a tungsten filament. Boron and aluminum will, however, react at temperatures in excess of 1,000°F. to form brittle aluminum borides. Accordingly, it has been found desirable to produce boron fibers with a silicon carbide coating; the coating acting as a barrier to prevent chemical reaction between the boron and aluminum matrix material. Such silicon carbide coated boron fibers are commercially available under the trademark BORSIC from Composite Materials Corporation of Broad Brook, Connecticut. The use of BORSIC or equivalent fibers does not, however, completely avoid the problem of a potential reduction in the strength of the composite as a consequence of reactions which occur during the braze bonding of a plurality of stacked composite tapes. When aluminum, either in the pure form or a alloy, becomes liquid, it reacts with silicon carbide. While the reaction between liquid aluminum and silicon carbide is at a rate which is much less than that which characterizes the aluminum-boron reaction, there will nevertheless be chemical decomposition of the silicon carbide resulting in cracks forming in the SiC coating on the fibers. These cracks act as stress risers and may cause the composite to fail at lower tensile or bending stresses than would otherwise occur.

The problem discussed in the immediately preceding paragraph cannot be overcome by elimination of liquid aluminum from the matrix since liquid aluminum alloy is necessary to achieve low pressure bonding of a plurality of stacked composite tapes. The desire to achieve low pressure bonding is dictated by the fact that such braze bonding techniques are particularly amenable to the production of composites of great dimensional magnitude since the bonding process can be performed with readily available production presses. Restated, the requirement for application of uniform pressure over the entire area to assure good densification is easily achieved, particularly for large area components, by means of low pressure braze bonding and by utilization of monolayer tapes which incorporate a brazing layer since all voids are readily filled by the braze material at the brazing temperature. Low pressure braze bonding of a stack of tapes is simple and inexpensive, and yields precisely spaced fibers with a minimum of residual stress in the composite. Further, this technique results in strong fiber-matrix bonding without fiber degradation.

SUMMARY OF THE INVENTION

The present invention overcomes the above briefly discussed and other deficiencies and disadvantages of the prior art by providing a novel and improved technique for the production of fiber-reinforced composites. The present invention is characterized by a braze bonding technique wherein the fibers of a fiber-reinforced monolayer composite tape are substantially isolated from liquid matrix metal or its alloy during low-pressure braze bonding of a plurality of stacked monolayer fiber-reinforced tapes.

A process in accordance with the present invention thus includes the steps of uniformly spacing the fibers on the foil substrate followed by the plasma arc spraying of a first layer of relatively high melting point matix material to achieve a mechanical-metallurgical bond of the fibers to the substrate. In accordance with a first embodiment of the invention, a second layer of material including the matrix metal is thereafter deposited over the first layer by a second plasma arc spraying step; the second layer comprising an alloy having a lower melting point than that of the first layer. The second layer of spray, which will hereinafter be referred to as the "braze alloy", is the component of the tape composite which has the lowest melting temperature. The braze alloy will, as a result of the plasma arc spraying procedure, form a mechanical-metallurgical bond to the first layer. The individual composite tapes may thereafter be stacked and low pressure braze bonded. Preferably, however, the individual composite tapes may be compacted at a sufficiently low temperature so that there is no melting of the braze alloy. The compacting step results in densification and develops a solid state metallurgical bond between the components of the composite which are in contact with one another. The densified tapes are thereafter stacked and subjected to low pressure braze bonding. In either case, during the braze bonding step the braze alloy will melt and the liquid metal therein will infiltrate voids in the adjacent substrate thus producing a metallurgical bond of high integrity. During the low pressure brazing step, however, the first layer will not melt and thus the fibers will be substantially isolated from the liquid matrix metal.

In accordance with a second embodiment of the invention the braze alloy and the matrix tape are rolled together by the manufacturer of the tape to provide a laminated matrix tape having the braze alloy on a first surface thereof. Thereafter, as described above, the fibers are uniformly positioned against the second surface of the foil and the "first" layer of relatively high melting point matrix material is plasma arc sprayed over the fibers. Thereafter, a plurality of composite tapes may be stacked and low pressure braze bonded. As in the first embodiment, it may be preferable to perform a densification step on each individual tape prior to stacking and bonding.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
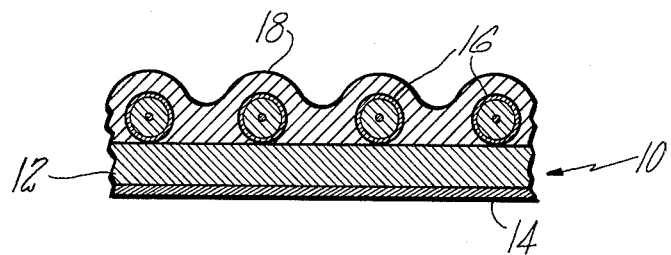
FIG. 1 is a schematic cross-sectional view of a single fiber-reinforced composite tape in accordance with a first embodiment of the present invention.

Referring to FIG. 1 a laminated metal substrate is indicated generally at 10. Substrate 10 includes a metal foil 12 having a layer of metal 14 bonded to a first surface thereof. Layer 14 will be comprised of a "braze alloy"; i.e. layer 14 will be comprised of an alloy of the selected matrix material and will be the lowest melting point material in the tape "system". Foil 12 and brazing alloy 14 are rolled together by the aluminum foil fabricator. In a typical example foil 12 comprised one mil thick type 6061 aluminum alloy while layer 14 was one-fourth mil thick and comprised type 713 aluminum alloy.

The reinforcing fibers 16 will, as previously noted, comprise BORSIC fibers available from Composite Materials Corporation of Broad Brook, Connecticut. These fibers will typically have a nominal diameter of 5.7 mils and will comprise a layer of boron which has been applied to a tungsten filament by means of a continuous vacuum deposition process. Thereafter, in the manner known in the art, a silicon carbide coating is deposited over the boron. The fibers are arranged on the second surface of foil 12; i.e., on the surface disposed opposite to that which contacts braze alloy layer 14. The parallel positioning of the BORSIC fibers on substrate 10 is accomplished in accordance with the techniques of above referenced U.S. Pat. Nos. 3,606,667 and 3,615,277.

The next step to be performed in accordance with the invention comprises the formation of a thin layer 18, hereinafter the "thin spray", of a suitable alloy over fibers 16. Layer 18 is applied by means of plasma arc spraying as described in the referenced patents. In the example being discussed, where an aluminum matrix is ultilized, the "thin spray" 18 will comprise an aluminum alloy having a higher melting point than the "braze alloy" comprising layer 14.

Figure 2:
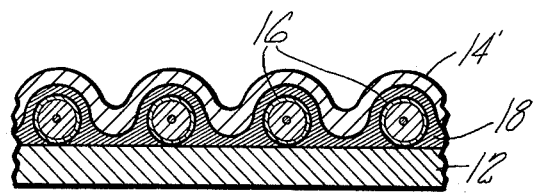
FIG. 2 is a schematic cross-sectional view of a single fiber-reinforced composite tape in accordance with a second embodiment of the present invention.

Before discussing the manner of utilizing the composite tape of FIG. 1, the embodiment of FIG. 2 will be described. In FIG. 2 a matrix metal foil 12 has applied thereto, in the manner of referenced U.S. Pat. Nos. 3,606,667 and 3,615,277, the BORSIC fibers 16 and "thin spray" of relatively high melting point material 18. In a typical example foil 12 will comprise 6061 aluminum alloy and layer 18 will also comprise 6061 aluminum alloy. Fibers 16 would be 5.7 mil nominal diameter, BORSIC fibers. Thereafter, by means of a second plasma arc spraying step, the "braze alloy" 14' will be deposited over the "thin spray" 18. The "braze alloy" 14 will typically comprise type 713 aluminum alloy.

Preferably, but not necessarily, the individual composite tapes of FIGS. 1 and 2 would be densified prior to stacking and braze bonding. The densification step consists of compacting the individual tapes with an applied pressure in the range of 2,000 to 5,000 psi and at a temperature which is sufficiently low to insure that there is no melting of "braze alloy" layers 14 or 14'. Restated, densification will be performed by the application of temperature and pressure with care being taken to assure that the temperature remains in the range of 50 to 100°F. below the melting point of the lowest melting point material comprising the composite tape.

With or without the densification step, which produces a good solid state metallurgical bond between the various elements of the composite tape, a plurality of tapes are thereafter stacked and subjected to pressure and a temperature above that commensurate with the melting point of "braze alloy" 14 or 14' but less than the melting point of the "thin spray" 18. During the brazing step liquid metal from the braze alloy infiltrates voids in the adjacent layers, which willl be the foil 12 of one tape in the stack and the "thin spray" of the next adjacent tape in the stack. This liquid metal infiltration provides an extremely good metallurgical bond throughout the stack. The braze bonding step formed on a plurality of stacked composite tapes will be performed with an applied pressure of 100 to 1,000 psi with temperatures dependent upon the composition of layers 14 and 18. Higher pressures can, of course, by employed.

Examples of materials suitable for use in accordance with the present invention are set forth below in Table I:

To summarize the invention, the economic factors controlling the application of metal matrix composites relate both to the initial materials cost and the cost of processing to achieve the finished articles of commerce. In accordance with the present invention, metal matrix composites can be fabricated using pressures of less than 1,000 psi and thus individual tapes, such as depicted in FIGS. 1 and 2, are particularly well suited for the fabrication of parts using readily available autoclaves which are capable of operating at temperatures up to and above 1,000°F. at several hundred psi pressure. The high degree of utility inherent in the present invention is the result of the avoidance of contact between molten matrix material and the reinforcing fibers which, in the prior art, has caused a fiber-metal reaction and associated fiber degradation. The fiber-metal interaction is avoided by use of the "thin spray" which has a higher melting point than the "braze alloy" and thus protects the fibers from contact with molten braze

TABLE I

| No. | Fiber | Diameter | Matrix Foil | "thin spray" | "braze alloy" |
|---|---|---|---|---|---|
| A. | BORSIC | 5.7 mil (140 fibers per inch) | 6061 aluminum alloy (1 mil) | 6061 aluminum alloy (2–6 mils sprayed) | 713 aluminum alloy (6–10 mils sprayed) |
| B. | BORSIC | 5.7 mil (140 fibers per inch) | 3003 aluminum alloy (1 mil) | 3003 aluminum alloy (2–6 mils sprayed) | 713 aluminum alloy (6–10 mils sprayed) |
| C. | BORSIC | 5.7 mil (140 fibers per inch) | 6061 aluminum alloy (1 mil) | 6061 aluminum alloy (2–6 mils sprayed) | 716 aluminum alloy (6–10 mils sprayed) |
| D. | BORSIC | 5.7 mil (140 fibers per inch) | 2024 aluminum alloy (1 mil) | 2024 aluminum alloy (2–6 mils sprayed) | 7075 aluminum alloy (6–10 mils sprayed) |
| E. | BORSIC | 5.7 mil (140 fibers per inch) | 6061 aluminum alloy (1 mil) | 6061 aluminum alloy (2–6 mils sprayed) | 713 aluminum alloy (¼–½ mils foil) |
| F. | BORSIC | 5.7 mil (140 fibers per inch) | 3003 aluminum alloy (1 mil) | 3003 aluminum alloy (2–6 mils sprayed) | 713 aluminum alloy (¼–½ mils foil) |
| G. | BORSIC | 5.7 mil (140 fibers per inch) | 1100 aluminum alloy (1 mil) | 1100 aluminum alloy (2–6 mils sprayed) | 317 aluminum alloy (¼–½ mils foil) |

The following precess parameters are applicable to the braze bonding step:

| EXAMPLE NO. | TEMPERATURE RANGE | TIME AT TEMPERATURE | APPLIED PRESSURE |
|---|---|---|---|
| 1. (Type No.A Material) | 1090 ± 10°F | 2 to 10 minutes | 300 psi |
| 2. (Type No.E Material) | 1090 ± 10°F | 2 to 10 minutes | 300 psi |
| 3. (Type No.B Material) | 1115 ± 10°F | 2 to 10 minutes | 500 psi |
| 4. (Type No.F Material) | 1115 ± 10°F | 2 to 10 minutes | 500 psi |
| 5. (Type No.G Material) | 1115 ± 10°F | 2 to 10 minutes | 500 psi |

Tensile test specimens of composite laminates produced in the manner described above have shown, for composites including a volume fraction of 50% BORSIC fibers, a 20% improvement in axial strength over the average strength of previous laminates which did not include the "thin spray" 18.

alloy metal. The materials chosen in accordance with the invention must thus meet the following criteria:

1. The solidus temperature of the base foil 12 and "thin spray" 18 must exceed the solidus, and preferably the liquidus, of braze alloy 14 or 14'; or
2. The metals comprising foil 12 and "thin spray" 18 must be of the same composition and this composition will form a low melting point phase when alloyed, by eutectic means or otherwise, with the braze alloy 14 or 14'.

If criteria (1) is observed, the braze bonding temperature is chosen such that the foil and "thin spray" remain solid and the reinforcing fibers thus do not come in contact with liquid matrix metal. Similarly, if criteria (2) is observed, the relative amounts of constituent metals and the bonding temperature will be chosen to prevent contact of liquid metal with the reinforcing fibers. Thus, observing criteria (2) the temperature is raised to above the melting point of the "braze alloy" which then bonds through the action of a transient liquid phase due to the symmetrical nature of the metal layup.

While preferred embodiments have been shown and described, various modifications and substitutions may be made thereto without departing from the spirit and scope of the invention. For example, the densification step may be accomplished either after only the first layer has been plasma sprayed or after both layers have been plasma sprayed. Also, 4.2 or 8.1 mil nominal diameter BORSIC fibers may be employed and the number of fibers per inch may be varied as necessary or desirable. Accordingly, it is to be understood that the present invention has been described by way of illustration and not limitation.

What is claimed is:

1. A method for the manufacture of fiber-reinforced metal matrix composites comprising the steps of:

positioning a plurality of evenly spaced reinforcing members on a first surface of a metallic sheet comprising the matrix metal;

depositing a layer of a first alloy of the matrix metal over the reinforcing members;

providing a layer of a second alloy of the matrix metal on an exposed surface of the sheet-first alloy layer intermediate thereby forming a fiber-reinforced metal matrix tap intermediate the second alloy being selected to have a lower melting point than the first alloy;

stacking a plurality of thus formed tapes; and bonding the stacked tapes together while preventing contact of liquid metal with the reinforcing members.

2. The method of claim 1 wherein the step of positioning the reinforcing members includes:

selecting coated metallic fibers having a high modulus of elasticity; and arranging the fibers in parallel fashion on a light weight metal foil.

3. The method of claim 2 further comprising the step of:

compacting individual tapes prior to stacking by subjecting the tapes to pressure and an elevated temperature below the melting point of the second alloy.

4. The method of claim 2 further comprising the step of:

compacting the individual intermediates prior to providing the second alloy layers.

5. The method of claim 2 wherein the steps of depositing the first alloy and providing the second alloy layer include:

subjecting the foil and fibers to successive plasma arc spraying steps.

6. The method of claim 3 wherein the steps of depositing the first alloy and providing the second alloy layer include:

subjecting the foil and fibers to successive plasma arc spraying steps.

7. The method of claim 2 wherein the step of providing the second alloy layer comprises:

rolling the metal foil with a braze alloy foil prior to arranging the fibers on the exposed surface of the metal foil.

8. The method of claim 7 wherein the step of depositing the first alloy comprises:

plasma arc spraying the alloy over the fibers.

9. A braze bondable metal matrix tape comprising:

a metallic foil, said foil including aluminum;

a plurality of evenly spaced parallel oriented reinforcing fibers positioned on a first surface of said foil;

a thin layer of a first aluminum alloy bonding the fibers to the foil, said first alloy contacting only the fibers and said first surface of the foil; and a layer of an aluminum braze alloy in contact with an exposed surface of the fiber-foil-first alloy layer matrix, said braze alloy having a lower melting temperature than said first alloy.

10. The tape of claim 9 wherein the reinforcing fibers comprises:

silicon carbide coated boron filaments.

* * * * *